United States Patent
Sun et al.

(10) Patent No.: US 11,424,968 B1
(45) Date of Patent: Aug. 23, 2022

(54) RETIMER TRAINING DURING LINK SPEED NEGOTIATION AND LINK TRAINING

(71) Applicant: Credo Technology Group Limited, Grand Cayman (KY)

(72) Inventors: Junqing Sun, Fremont, CA (US); Fang Cai, Milpitas, CA (US); Hung-Yi Chen, Hsinchu (TW); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 17/344,323

(22) Filed: Jun. 10, 2021

(51) Int. Cl.
*H04L 25/03* (2006.01)
*H04L 7/00* (2006.01)

(52) U.S. Cl.
CPC ...... *H04L 25/03885* (2013.01); *H04L 7/0016* (2013.01); *H04L 25/03057* (2013.01); *H04L 2025/0377* (2013.01)

(58) Field of Classification Search
CPC ..... H04L 7/0004; H04L 7/0016; H04L 7/002; H04L 7/0025; H04L 7/0062; H04L 7/0334; H04L 25/03006; H04L 25/03057; H04L 25/03146; H04L 25/03885; H04L 2025/0377
USPC .......... 375/231–233, 346, 348; 708/322, 323
See application file for complete search history.

(56) References Cited

U.S. PATENT DOCUMENTS

| | | | |
|---|---|---|---|
| 6,618,436 B2 * | 9/2003 | Greiss | H04L 25/063 375/317 |
| 7,746,969 B2 * | 6/2010 | Bryan | H04L 25/03878 375/345 |
| 8,488,729 B1 | 7/2013 | Mendel et al. | |
| 8,737,491 B1 * | 5/2014 | Wilson | H04L 25/03343 375/244 |
| 8,832,511 B2 | 9/2014 | Chen et al. | |
| 9,077,574 B1 * | 7/2015 | Healey | H04L 25/03057 |

(Continued)

FOREIGN PATENT DOCUMENTS

| CN | 1770660 B | 5/2006 |
|---|---|---|
| CN | 1941649 B | 4/2007 |

(Continued)

OTHER PUBLICATIONS

Information Technology—Open Systems Interconnection—Basic Reference Model: The Basic Model, 1994.

(Continued)

*Primary Examiner* — Young T. Tse

(74) *Attorney, Agent, or Firm* — Ramey LLP; Daniel J. Krueger

(57) ABSTRACT

Disclosed retimer modules and methods enable equalizer training during link speed negotiation. One illustrative retimer module includes: an analog to digital converter that uses a sampling clock to digitize a receive signal; an equalizer that converts the digitized receive signal into an equalized signal; a decision element that derives a receive symbol stream from the equalized signal; and a clock recovery module that derives the sampling clock based at least in part on an equalization error of the equalized signal, the sampling clock having a frequency with a range including a baud rate of the receive signal at a first supported speed and including a frequency not less than twice the baud rate of the receive signal at a second supported speed.

20 Claims, 5 Drawing Sheets

(56) References Cited

U.S. PATENT DOCUMENTS

| | | | |
|---|---|---|---|
| 9,106,570 | B2 | 8/2015 | Masood |
| 9,385,859 | B2 | 7/2016 | Kuan et al. |
| 9,647,859 | B2 | 5/2017 | Ghiasi |
| 10,069,660 | B1 | 9/2018 | Sun et al. |
| 10,212,260 | B2 | 2/2019 | Sun |
| 2001/0021987 | A1 | 9/2001 | Govindarajan et al. |
| 2003/0174788 | A1 | 9/2003 | Li |
| 2007/0286315 | A1* | 12/2007 | Hong ................ H04L 25/03057 375/345 |
| 2008/0219390 | A1* | 9/2008 | Simpson ............... H04L 7/0062 375/355 |
| 2009/0086753 | A1 | 4/2009 | Lund et al. |
| 2009/0319838 | A1 | 12/2009 | Jones |
| 2010/0329325 | A1 | 12/2010 | Mobin et al. |
| 2012/0063295 | A1 | 3/2012 | Bliss |
| 2013/0013749 | A1 | 1/2013 | Kane |
| 2013/0073749 | A1 | 3/2013 | Tremblay et al. |
| 2013/0343400 | A1 | 12/2013 | Lusted et al. |
| 2014/0086264 | A1 | 3/2014 | Lusted et al. |
| 2014/0146833 | A1 | 5/2014 | Lusted et al. |
| 2014/0241411 | A1 | 8/2014 | Ghiasi |
| 2015/0003505 | A1 | 1/2015 | Lusted et al. |
| 2015/0186201 | A1 | 7/2015 | Ran |
| 2016/0037486 | A1 | 2/2016 | Wentzloff et al. |
| 2016/0080101 | A1 | 3/2016 | Naeini et al. |
| 2016/0134394 | A1 | 5/2016 | Tiruver et al. |
| 2016/0323164 | A1 | 5/2016 | Cao |
| 2016/0337114 | A1 | 11/2016 | Baden et al. |
| 2016/0337183 | A1 | 11/2016 | Cornett et al. |
| 2016/0352557 | A1* | 12/2016 | Liao ................. H04L 25/03057 |
| 2017/0245226 | A1 | 8/2017 | Chow |
| 2017/0324657 | A1 | 11/2017 | Zhong |
| 2018/0041332 | A1 | 2/2018 | Yang |
| 2018/0227149 | A1 | 8/2018 | Johnson |
| 2019/0386851 | A1 | 12/2019 | Dai et al. |
| 2020/0304352 | A1* | 9/2020 | Azenkot ........... H04L 25/03063 |

FOREIGN PATENT DOCUMENTS

| | | |
|---|---|---|
| CN | 105814816 A | 7/2016 |
| CN | 106411322 A | 2/2017 |
| CN | 108737024 A | 11/2018 |
| CN | 109075992 A | 12/2018 |
| CN | 109286416 A | 1/2019 |

OTHER PUBLICATIONS

International Preliminary Report on Patentability dated Sep. 10, 2019 for PCT/CN2017/075961.

International Preliminary Report on Patentability dated Jul. 23, 2020 for PCT/ US2018/013361.

International Search Report and Written Opinion, dated Dec. 6, 2017 for PCT/CN2017/075961, 12 pages.

International Search Report and Written Opinion, dated Sep. 28, 2018 for PCT/US2018/013361, 18 pages.

Physical Coding Sublayer (PCS) for 64B/66B, Type 50GBASE-R, Feb. 3, 2017.

Physical Medium Dependent (PMD) Sublayer and Baseband Medium, Type 50G BASE-CR, 100G BASE-CR2, and 200G BASE-CR4, Feb. 3, 2017.

Laskin, Ekaterina. On-Chip Self-Test Circuit Blocks for High-Speed Applications. 2006. University of Toronto, Master Thesis.

IEEE Standard for Ethernet—Section 1; IEE Std. 802.3-2015 Revision of IEE Std 802.3.2012; Mar. 4, 2016; whole document.

INCITS Working Draft Proposed American National Standard for Information Technology—Fibre Channel—Framing and Signaling-5 (FC-FS-5); INCITS 545-20xx Rev 1.0 Apr. 3, 2018; whole document.

First Office Action dated Apr. 6, 2021 for Chinese Patent Application No. 201780025327.6.

Fibre Channel—Framing and Signaling—5 (FC-FS-5) Rev 1.0. (2018). Information Technology Industry Council, 545-20xx. draft proposed American National Standard for Information Technology.

Reed-Solomon Forward Error Correction (RS-FEC) sublayer for 50GBASE-R PHYs, Draft Amendment to IEEE Std 802.3-2015, Feb. 3, 2017, pp. 142-159, 18 pgs.

Reed-Solomon Forward Error Correction (RS-FEC) sublayer for 100GBASE-R PHYs, Draft Amendment to IEEE Std 802.3-2015, Feb. 3, 2017, pp. 370-402, 33 pgs.

\* cited by examiner

FIG. 1
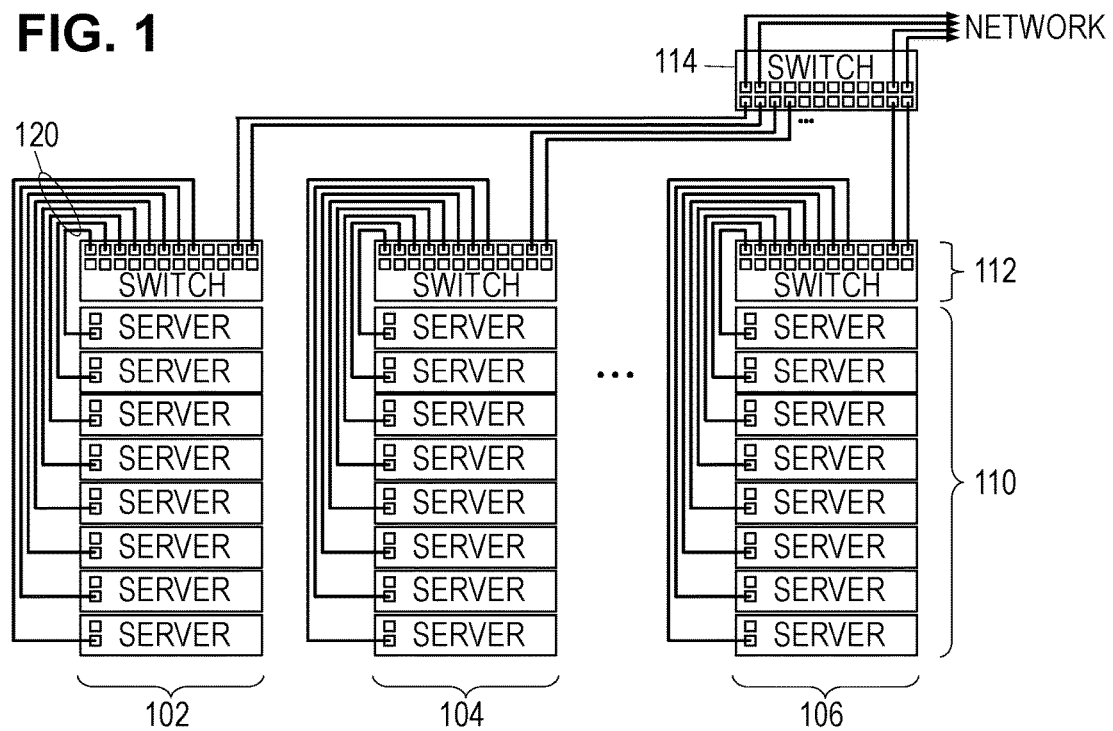
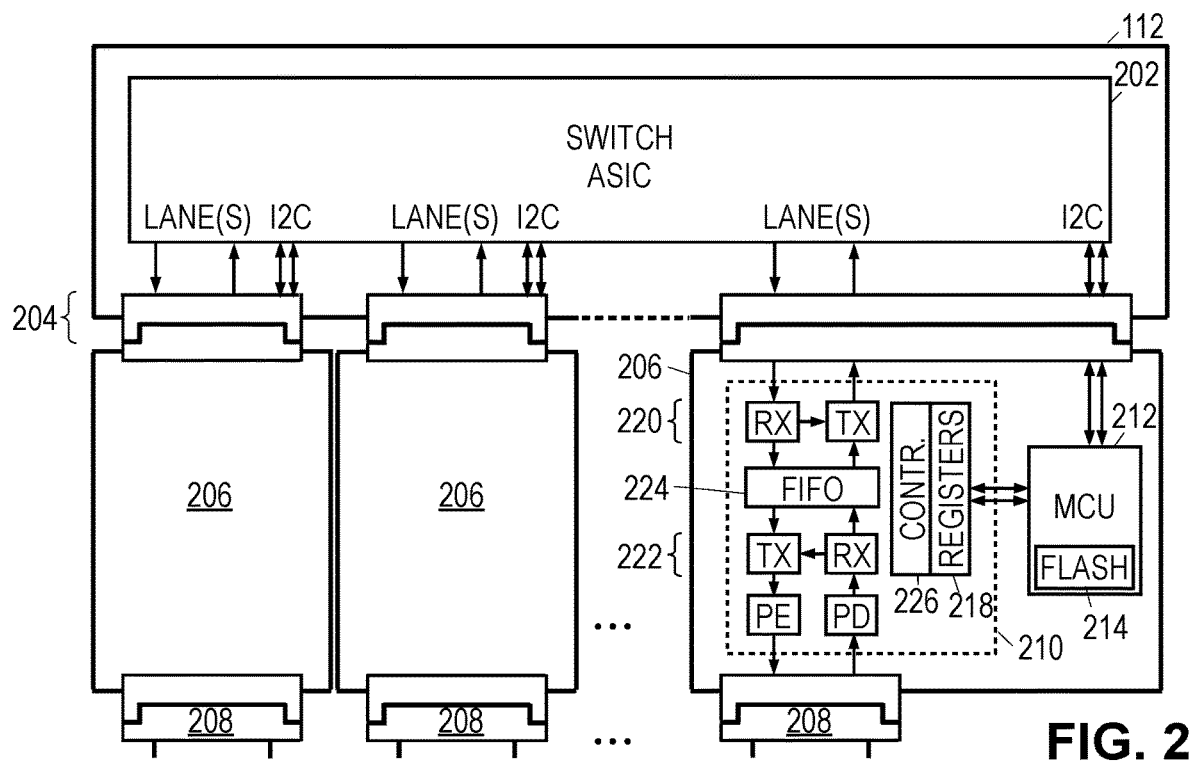
FIG. 2

RETIMER TRAINING DURING LINK SPEED NEGOTIATION AND LINK TRAINING

TECHNICAL FIELD

The present disclosure relates to retimers with adaptive equalizers, and more specifically to enabling such retimers to support communication protocols with different signal constellations and symbol rates.

BACKGROUND

Various standards have been developed to support the need for ever-faster transport of ever-larger data volumes between devices. Fibre Channel is one such standard established by the International Committee for Information Technology Standards (INCITS) for use in storage area networks (SAN), offering data transfer rates that have approximately doubled every three years since 1993. One consequence of this evolution is that the various devices in a given network may be employing multiple generations of the standard. To enable gradual upgrades of network hardware, the Fibre Channel standard suggests that each device should provide backward compatibility with up to three previous generations of the standard, and specifies mechanics of a Link Speed Negotiation (LSN) method that may be employed by linked devices to determine the highest speed supported by both devices on that link.

LSN involves, among other things, having a local transmitter send training signals at progressively lower speeds until the remote receiver determines that at least the speed information field of the training signal is satisfactorily received and acknowledged. As it attempts to establish communication, the receiver iterates through its supported speeds. For higher baud rates, it is expected that retimers with adaptive equalizers will be needed to ensure adequate communications link performance, which potentially extends the link training time beyond the module response time provided during the LSN process.

SUMMARY

Accordingly, there are disclosed herein retimer modules and methods enabling equalizer training during link speed negotiation. One illustrative retimer module includes: an analog to digital converter that uses a sampling clock to digitize a receive signal; an equalizer that converts the digitized receive signal into an equalized signal; a decision element that derives a receive symbol stream from the equalized signal; and a clock recovery module that derives the sampling clock based at least in part on an equalization error of the equalized signal, the sampling clock having a frequency with a range including a baud rate of the receive signal at a first supported speed and including a frequency not less than twice the baud rate of the receive signal at a second supported speed.

An illustrative retiming method includes: digitizing a receive signal in accordance with a sampling clock; converting the digitized receive signal into an equalized signal; obtaining a receive symbol stream from the equalized signal; and deriving the sampling clock based at least in part on an equalization error of the equalized signal, the sampling clock having a frequency with a range including a baud rate of the receive signal at a first supported speed and including a frequency not less than twice the baud rate of the receive signal at a second supported speed.

Each of the foregoing implementations may be performed individually or conjointly and may be combined with any one or more of the following optional features: 1. an adaptation module that disables updating of equalizer coefficients when the baud rate of the receive signal is not within said range. 2. during a link speed negotiation phase, the adaptation module enables updating of equalizer coefficients only within a predetermined window after transmission word synchronization is achieved. 3. the adaptation module at least temporarily disables updating of equalizer coefficients when detecting or initiating an ingress speed change. 4. the clock recovery module includes: a timing error unit that determines a timing error signal based at least in part on the equalization error; a phase interpolator that obtains the sampling clock from a clock signal and a control signal derived from the timing error signal; a phase lock loop that generates the clock signal; and a feedback path that controls a frequency of the clock signal based at least in part on the timing error signal when the baud rate of the receive signal is within said range. 5. the feedback path includes an error accumulator that is frozen when the baud rate of the receive signal is not within said range. 6. the decision element employs multiple decision thresholds. 7. an adaptation module that tunes the decision thresholds during four-level pulse amplitude modulation (PAM4) signaling and disables tuning during non-return to zero (NRZ) signaling. 8. the adaptation module preserves the tuned decision thresholds during NRZ signaling. 9. the adaptation module sets $T_{-2}$, $T_2$ decision thresholds to default values during NRZ signaling.

BRIEF DESCRIPTION OF THE DRAWINGS

FIG. 1 shows an illustrative network.
FIG. 2 is a block diagram of an illustrative switch.

DETAILED DESCRIPTION

Figure 3:
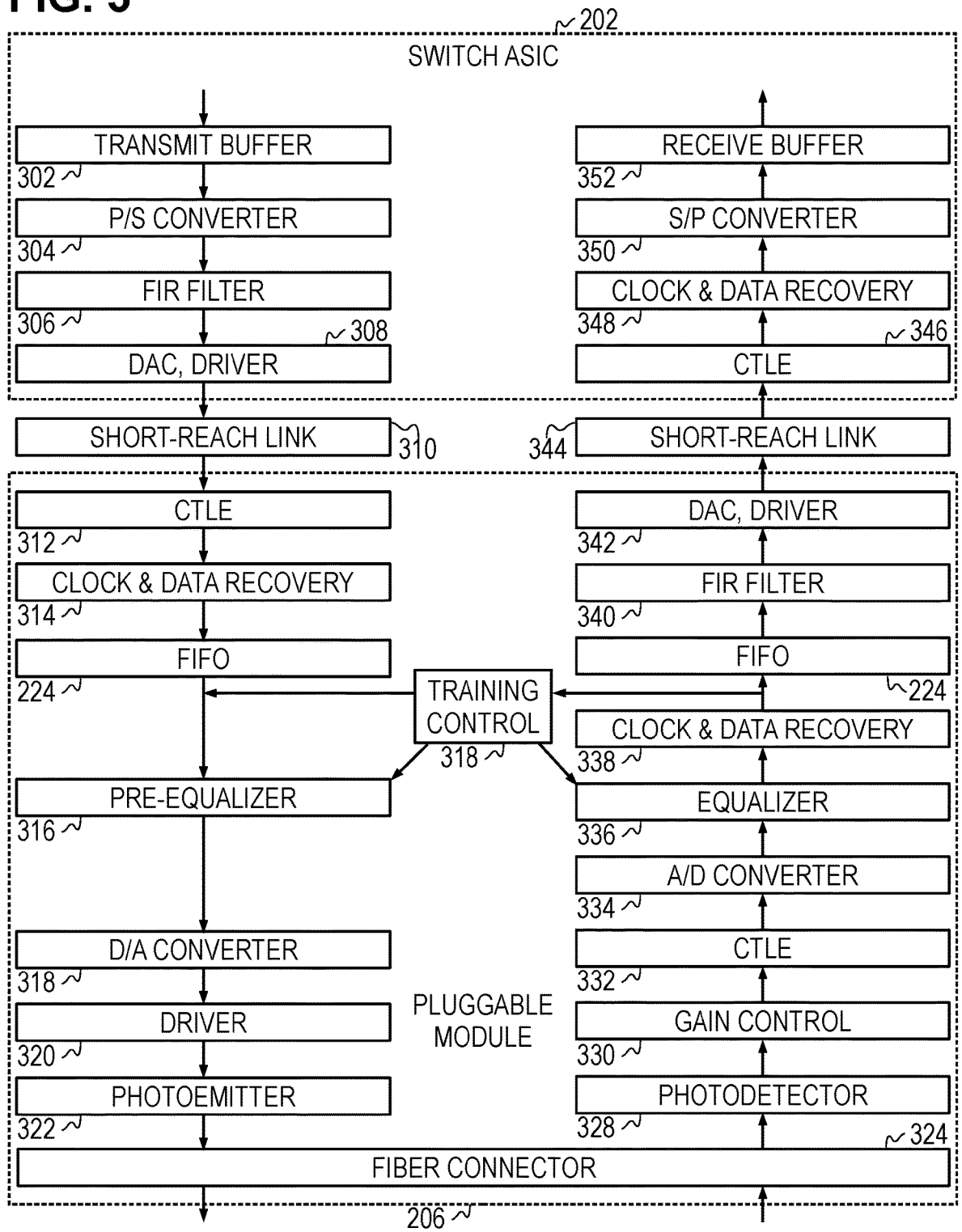
FIG. 3 is a block diagram of an illustrative switch port.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

For context, FIG. 1 shows an illustrative network such as might be found in a data processing center, with multiple server racks 102-106 each containing multiple servers 110 and at least one "top of rack" (TOR) switch 112. The TOR switches 112 are connected to aggregator switches 114 for interconnectivity and connection to the regional network and internet. (As used herein, the term "switch" includes not just traditional network switches, but also routers, network bridges, hubs, and other devices that forward network communication packets between ports.) Each of the servers 110 is connected to the TOR switches 112 by network cables 120, which preferably provide high speed differential communications compatible with the Fibre Channel standard.

FIG. 2 shows an illustrative switch 112 with an application-specific integrated circuit (ASIC) 202 that implements packet-switching functionality coupled to port connectors 204 for pluggable modules 206. Pluggable modules 206 couple between the port connectors 204 and cable connectors 208, to improve communications performance by way of equalization and optional format conversion (e.g., converting between electrical and optical signals). The pluggable modules 206 may comply with any one of various pluggable module standards including SFP, SFP-DD, QSFP, QSFP-DD, and OSFP.

The pluggable modules 206 may each include a retimer chip 210 and a microcontroller chip 212 that controls operation of the retimer chip 210 in accordance with firmware and parameters that may be stored in nonvolatile memory 214. The operating mode and parameters of the pluggable retimer modules 206 may be set via a two wire bus such as I2C or MDIO that connects the microcontroller chip 212 to the host device (e.g., switch 112). The microcontroller chip 212 responds to queries and commands received via the two wire bus, and responsively retrieves information from and saves information to control registers 218 of the retimer chip 210.

Retimer chip 210 includes a host-side transceiver 220 coupled to a line-side transceiver 222 by first-in first-out (FIFO) buffers 224. FIG. 2 shows optional photoemitter (PE) and photodetector (PD) modules to convert between optical and electrical line-side signals. Though only a single lane is shown in the figure, the transceivers may support multiple lanes conveyed via multiple corresponding optical fibers or electrical conductors. A controller 226 coordinates the operation of the transceivers in accordance with the control register contents, and may provide for multiple communication phases pursuant to a communications standard such as the Fibre Channel Standard published by the American National Standard for Information Technology Accredited Standards Committee INCITS, which provides phases for link speed negotiation (LSN), equalizer training, and normal operation.

FIG. 3 shows an example of the components making up the transmit (egress) and receive (ingress) chains for one of the switch ports, including the pluggable module 206. Though the components are shown and described here using function blocks, it should be understood that the blocks represent integrated circuit modules that are taught in the academic literature and commercially available in component libraries of various application specific integrated circuit design software packages and/or implementable as firmware executable by programmable controllers or processing units.

For each lane, the switch ASIC provides a transmit buffer 302 to buffer the digital transmit data, which is typically received in blocks of bits or multi-bit symbols. A parallel-to-serial converter 304 accesses the buffer to produce, in this example, a serialized stream of NRZ (non-return to zero) or PAM4 (4-level pulse amplitude modulation) symbols. Other example implementations may produce a stream of channel-encoded bits or other symbols. The symbol stream is preferably compliant with a standard protocol such as the transmission protocol of the Fibre Channel standard including Transmission Words and Ordered Sets (patterns for special functions such as delimiting frames and aligning lanes).

An optional finite impulse response (FIR) filter 306 may be used to provide pre-emphasis of high frequency components to combat attenuation of the short reach link 310. A digital-to-analog converter (DAC) converts the filtered signal to analog form and a driver 308 supplies sufficient current to convey the transmit signal across the short-reach link 310 to the pluggable module 206. The short-reach link 310 primarily consists of conductive printed circuit board traces coupling the switch ASIC to the pluggable module connector. Though the traces may be limited to, say, less than 500 mm, they may nevertheless be expected to cause significant frequency-dependent attenuation and dispersion at the upper range of signal frequencies contemplated here.

In the pluggable module 206, a continuous time linear equalizer (CTLE) filter 312 cooperates with the optional FIR filter 306 to compensate for the effects of the short-reach link 310. A clock and data recovery (CDR) module 314 operates on the filtered signal to derive a clock signal for sampling and re-digitizing the digital symbol stream. An optional FIFO buffer 224 receives the digital symbol stream from the CDR module. An optional pre-equalizer 316 operates on the digital symbol stream to at least partly compensate for the line-side channel effects. A DAC 318 converts the pre-equalized signal to an analog signal, which the driver 320 for the photoemitter amplifies to drive the photoemitter 322. The fiber connector 324 couples the optical signal from the photoemitter to an optical fiber for conveyance to a remote photodetector and receiver.

We note here that pre-equalization generally increases signal energy in those frequency ranges where the channel signal attenuation is highest, thereby increasing the amount of signal energy dissipation within the channel, in addition to necessitating power consumption by the pre-equalizer 416 itself. For the contemplated channels, however, this increased power consumption is small in comparison to the achievable power savings resulting from associated reductions in receiver complexity, particularly the power savings that can be achieved with the equalizer design.

In the pluggable module 206, the fiber connector 324 further couples optical fibers to associated photodetectors 328, which convert the optical receive signals into electrical form, typically a receive signal current that can be converted to a receive signal voltage by a transimpedance amplifier (TIA). A gain control amplifier 330 applies an adjustable gain to optimize the receive signal range for processing by the subsequent components of the receive chain. A CTLE filter 332 provides anti-aliasing and optional spectral shaping prior to signal digitization by analog-to-digital converter 334. A digital equalizer 336 provides adaptive equalization, cooperating with the remote pre-equalizer to compensate for channel effects. A CDR module 338 derives a sampling clock signal and recovers a receive symbol stream from the equalized signal. An optional FIFO buffer receives the digital receive symbol stream from the CDR module 338.

Pluggable module 206 further includes an optional FIR filter 340 to provide pre-emphasis of high frequency components to combat attenuation of the short reach link 344. A digital-to-analog converter (DAC) converts the filtered signal to analog form and a driver 342 supplies sufficient current to convey the transmit signal across the short-reach link 344 to the ASIC 202, where CTLE filter 346 cooperates with the optional FIR filter 340 to compensate for the effects of the short-reach link 344. A clock and data recovery (CDR) module 348 operates on the filtered signal to derive a sample clock signal for recovering the receive symbol stream. A serial-to-parallel converter 350 stores blocks of the receive symbol stream in a receive buffer 352, enabling the use of lower clock rates by the core circuitry of the ASIC 202.

Pluggable module 206 further includes a training control module 318 to adapt coefficients of the pre-equalizer module 316 and equalizer 336. The training control module 318 may generate a sequence of training frames that take the place of the transmit data stream for the duration of a link speed negotiation and link speed training phases, and may detect equalization errors associated with training frame symbols in the receive data stream. Combining the equalization errors with the training frame symbols, the training controller 318 can adapt the coefficients of a remote pre-equalizer and local equalizer 336 to optimize their combined compensation of the combined receive channel effects. Training controller 318 can communicate the remote pre-equalizer coefficient updates via various backchannel options including, e.g., dedicated fields in the training frames of the transmit symbol stream. Correspondingly, training controller 318 can extract updates for the local pre-equalizer 316 from dedicated fields in the frames of the receive symbol stream. For further details of one illustrative example, see, e.g., co-owned U.S. Pat. No. 10,212,260 "SerDes Architecture with a Hidden Backchannel Protocol", which is hereby incorporated herein by reference.

Figure 4:
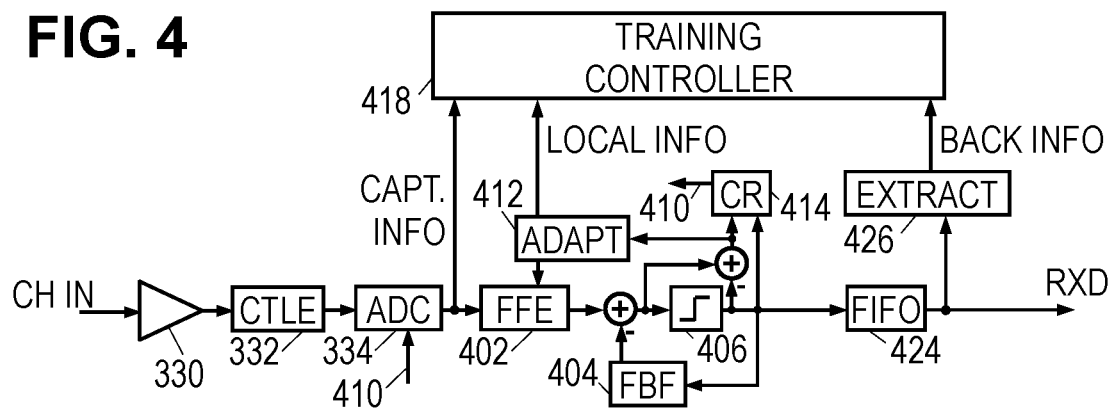
FIG. 4 is a block diagram of an illustrative receive chain.
Figure 5:
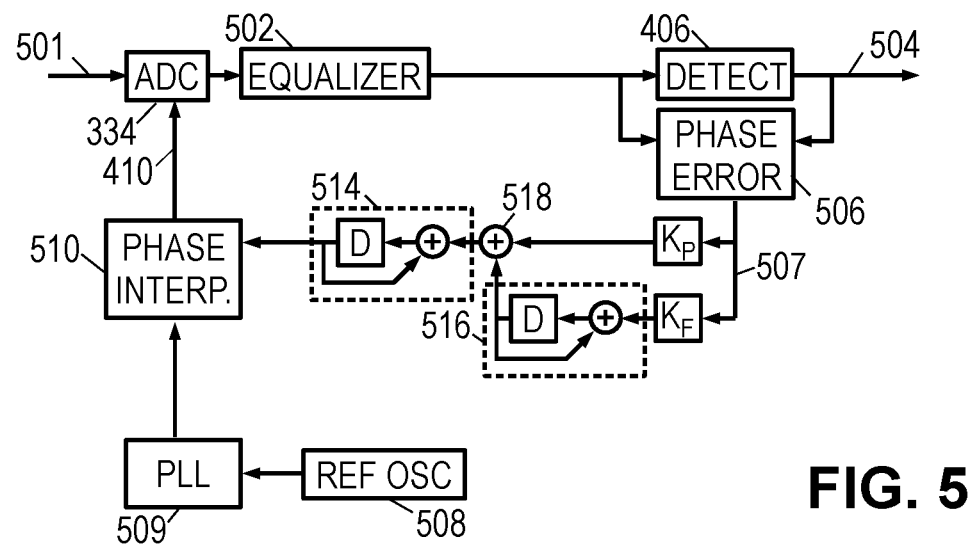
FIG. 5 is a block diagram of an illustrative clock recovery module.

For further context, FIGS. 4 and 5 provide additional detail regarding an illustrative implementation of equalizer 336, CDR module 338, and training control module 318. In FIG. 4, an analog electrical signal (CH_IN) from photodetector 328 is amplified by gain controller 330, filtered by CTLE 332, and digitized by ADC 334 using a sampling clock 410. A digital feed-forward equalization (FFE) filter 402 may be used to reduce leading intersymbol interference in the digitized receive signal. The filtered receive signal is combined with a feedback signal to provide an equalized signal for a decision element 406. A feedback filter (FBF) 404 filters symbol decisions from the decision element 406 to produce the feedback signal, which corrects for trailing intersymbol interference in the filtered receive signal. This equalization and detection arrangement is known as decision feedback equalization (DFE), and it yields a stream of symbol decisions. Some receiver variations employ oversampling in the FFE 402 and FBF 404.

The input and output of decision element 406 may be differenced to provide an error signal for use by an adaptation module 412 and a clock recovery module 414. The adaptation module 412 uses the error signal combined with the filter inputs to optimize coefficients of the FFE 402 and FBF 404. The clock recovery module 408 uses the error signal, usually in combination with the symbol decisions, to derive the sampling clock signal 410.

A FIFO buffer 424 stores the digital data stream bits or symbols for retransmission across short-reach link 344. The received data stream may be structured as a sequence of frames each having a header and a payload. One or more fields in the frame headers may contain backchannel information, and if so, the extraction module 426 detects those fields and extracts the backchannel information for local use. As one example, the backchannel information may include adaptation information for the pre-equalization filter 316.

In addition to optimizing FFE and FBF coefficients, the adaptation module 412 may further determine adjustments for the CTLE filter 332 and for the remote transmit, or "pre-equalization", filter. The adaptation module 412 outputs locally-generated information (LOCAL_INFO), which includes the transmit filter coefficient adjustments and the convergence status. Where the system supports the use of a backchannel, the LOCAL_INFO is supplied to training controller 418 for communicating in the reverse direction on the data lane. Training control module 318 (FIG. 3) communicates the transmit filter adjustments and the convergence status via the backchannel to the source of the CH_IN signal. In that vein, the received signal includes back-channel information from the source of the CH_IN signal. The extraction module 426 detects the back-channel information (BACK_INFO) and passes it to the training controller 418. Once convergence is achieved, the receive chain is ready for normal operation.

FIG. 4 further shows a signal tap on the output of ADC 334, labeled as "CAPT. INFO". Training controller 418 may periodically buffer and capture intervals of the digitized receive signal for baud rate detection. In other variations, the signal may be captured from other points in the receive chain, such as the filtered receive signal at the output of the FFE, the equalized signal at the input to the decision element, or the symbol decisions at the output of the decision element.

Training controller 418 (part of training control module 318) receives the CAPT. INFO, BACK INFO, and LOCAL INFO. During normal operations, a multiplexer supplies the transmit data stream to pre-equalizer 316 with unmodified frame headers, but during the link speed negotiation and equalizer training phases, the multiplexer may introduce modified frame headers into the transmit data stream. During these phases, the transmit data stream comprises a training signal, and the header has fields for the backchannel information including convergence status and transmit filter coefficient adjustments (LOCAL_INFO) received from adaptation module 412. Note that even after the local receiver indicates filter convergence has occurred, the training controller 418 may prolong the training phase to coordinate training phase timing across each link of the channel.

The training controller 418 further accepts any backchannel information (BACK_INFO) extracted by module 414 from received training frames sent by the remote node. The training controller 418 applies the corresponding adjustments to the coefficients of transmit filter 316.

FIG. 5 shows additional detail for the clock recovery process. ADC 334 samples the analog receive signal 501 using the sampling clock 410 and provides a digital receive signal to the equalizer 502 (which may be a DFE as previously described, an FFE filter, or some other form of equalizer). A decision element 406 converts the equalized signal into a digital receive symbol stream 504.

A timing error unit 506 derives a timing error signal 507 using any suitable design for the timing error estimator including, e.g., a bang-bang or proportional phase detector. One suitable timing error estimator is set forth in co-owned U.S. Pat. No. 10,447,509, "Precompensator-based quantization for clock recovery", which is hereby incorporated herein by reference in its entirety. Other suitable timing error estimators can be found in the open literature, including, e.g., Mueller, "Timing Recovery in Digital Synchronous Data Receivers", IEEE Trans. Commun., v24n5, May 1976, and Musa, "High-speed Baud-Rate Clock Recovery", U. Toronto Thesis, 2008. Note, however, the chosen estimator should be suitable for use with oversampling, as the sampling clock rate for some supported speeds may be much larger than the baud rate.

The sampling clock signal 410 is optionally derived by a phase lock loop (PLL) 509 from a reference clock signal provided by a reference oscillator 508. A phase interpolator 510 operates on the sampling clock 410 to correct for phase and frequency offsets. The timing error signal 507 is used to control the phase interpolator 510 in a fashion that statistically minimizes the energy of the timing error signal. In a first feedback path, the timing error signal is scaled by a phase coefficient ($K_P$) and integrated by a phase error accumulator 514 to obtain a phase error signal, which is supplied as a control signal to the phase interpolator 510. In a second feedback path, the timing error signal is scaled by a frequency coefficient ($K_F$) and integrated by a frequency offset accumulator 516 to obtain a frequency offset signal. A summer 518 adds the frequency offset signal to the scaled timing error signal, supplying the sum to the phase error accumulator 514 to correct for the offsets.

With the foregoing context of an illustrative implementation, we now turn to the Link Speed Negotiation phase of establishing a Fibre Channel link between, say, switches or other host devices that comply with different generations of the Fibre Channel standard. Pursuant to the standard, Link Speed Negotiation includes the transmitter sending training signals at progressively lower speeds until the receiver determines that the signal can satisfactorily received and notifies the transmitter accordingly. For its part, the receiver iterates through its supported speeds, testing to see whether any of them match the currently transmitted training signal.

Thus, as an example, a Fibre Channel port of a given host may support the "16GFC" speed in which a data stream is conveyed using non-return to zero (NRZ) signaling with a 64b66b line code and standard-compliant framing and communications protocol at a line rate of 14.025 gigabaud to provide a nominal throughput of 1600 megabytes per second. Pursuant to the standard, the host may further support the two previous generations, "10GFC" and "8GFC". 10GFC uses NRZ signaling with the 64b66b line code at a line rate of 10.51875 gigabaud to provide a nominal throughput of 1200 megabytes per second. 8GFC uses NRZ signaling with an 8b10b line code at a line rate of 8.6 gigabaud to provide a nominal throughput of 800 megabytes per second.

Figure 6:
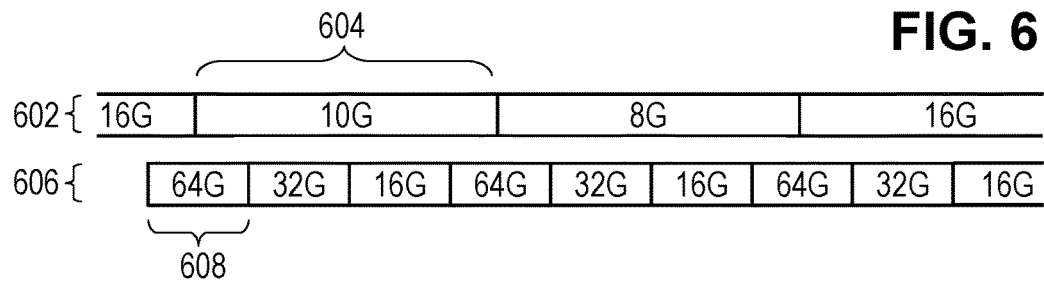
FIG. 6 is a timeline of an illustrative Link Speed Negotiation process.

As represented by line 602 of FIG. 6, the transmitter in such a host would cycle through the three supported speeds during Link Speed Negotiation, sustaining each for a predetermined interval 604, which is about 154 ms but allows for a millisecond of transition time between different speeds during which the link may be quiet or unstable. This host can notify its local pluggable module of the speed changes via the I2C/MDIO bus, so that the receiver can configure its equalizer as needed. However, the standard provides no sideband signals for the local pluggable module to similarly warn the remote pluggable module.

In spite of this circumstance, the cable should enable communication from this host to a pluggable module in a remote host that supports, for example, "64GFC", "32GFC", and "16GFC". 64GFC uses PAM4 signaling with a 256b257b line code at a line rate of 28.9 gigabaud to provide a nominal throughput of 6400 megabytes per second. (Note, however, that 64GFC uses NRZ signaling for the Link Speed Negotiation.) 32GFC uses NRZ signaling with the 256b257b line code at 28.05 gigabaud to provide a nominal 3200 megabytes per second. As represented by line 606 of FIG. 6, the receivers of the remote pluggable module and host cycle through each of the supported speeds, attempting to receive each for a predetermined interval 608 which in this example is about ⅓ the transmit interval 604, but can be less.

These short receive intervals present a challenge for the pluggable module receivers and switch port receivers which was unforeseen by the creators of the Fibre Channel standard. To adequately compensate for the nonlinearities of high-symbol rate signaling over optical channels, the above-disclosed receivers employ digital equalization. Without severely compromising performance, the phase lock loops cannot cope with frequent and sudden signaling speed changes. Further, if adaptation of the digital equalizers is attempted during a speed transition or subsequent settling of the PLL, equalization performance degrades quickly and in a potentially unrecoverable manner.

One potential way to at least partly address the speed-transition issue is to provide signal digitization and initial equalization at a fixed sampling frequency, i.e., a sampling frequency that may provide some degree of oversampling but which in any event does not match the symbol clock of lower baud-rate signals. However, another potential difficulty arises if the receive signal lacks sufficient signal energy across the full range of the expected receive signal bandwidth, as insufficient channel information may exist to enable proper coefficient training.

Figure 7A:
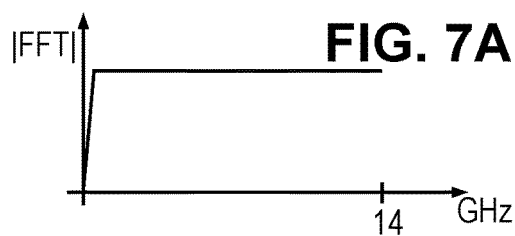
FIGS. 7A-7C show spectra of illustrative receive signals.
Figure 7B:
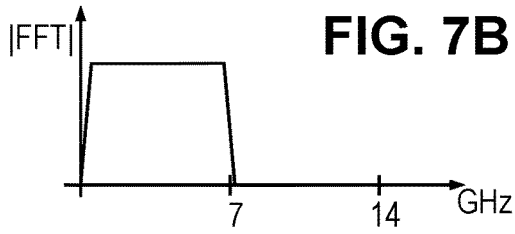
Figure 7C:
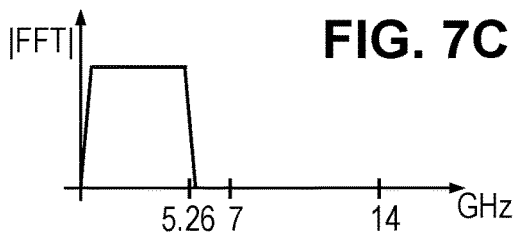

FIGS. 7A-7C compare the spectral content of the different speeds. 64GFC and 32GFC each use line rates above 28 gigabaud, and are expected to exhibit spectra such as that shown in FIG. 7A, being essentially flat from just above zero to their Nyquist frequency just above 14 GHz. (The channel may attenuate the higher frequencies somewhat, but there should nevertheless be substantial signal energy at the Nyquist frequency.)

In contrast, FIG. 7B shows the expected signal spectrum for 16GFC signaling, which uses a line rate of 14.025 gigabaud. Here the signal energy drops to insignificance above the Nyquist frequency of 7.013 GHz. FIG. 7C shows the expected signal spectrum for 10GFC, which uses a line rate of 10.51875 gigabaud. Here the signal energy drops to insignificance above 5.26 GHz. The lack of signal energy at higher frequencies may prevent adaptive equalization methods from performing properly, and indeed may cause the adapted coefficient values to diverge to a point that makes solution convergence infeasible.

Figure 8A:
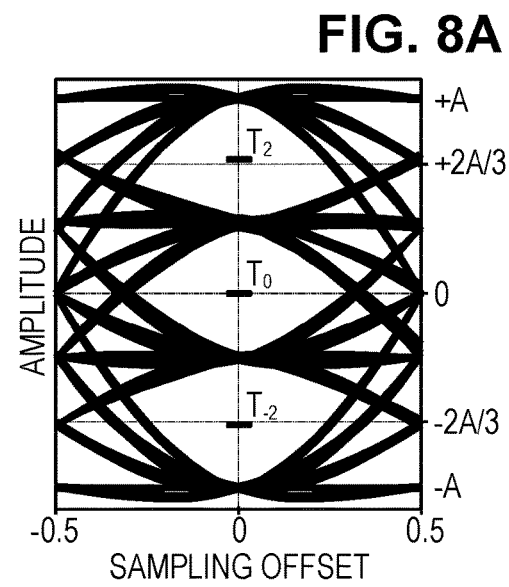
FIG. 8A is an illustrative PAM4 eye diagram.

Another potential challenge in addition to the speed transition and spectral deficiency issues is optimizing the decision thresholds for the PAM4 constellation. FIG. 8A is an illustrative PAM4 eye diagram with three active decision thresholds $T_{-2}$, $T_0$, $T_2$, to distinguish between the four potential symbol values. Where the minimum and maximum equalized signal target values at the sampling instants is $-A$ to $+A$, the decision thresholds are nominally set at 0 and $\pm 2A/3$. In the presence of nonlinearities, the optimal threshold positions will deviate from their nominal values. Note that before the equalizer coefficients have been fully trained, the decision eyes may be much smaller or non-existent, and improper positioning of the thresholds may prolong or prevent proper training of the equalized coefficients.

Figure 8B:
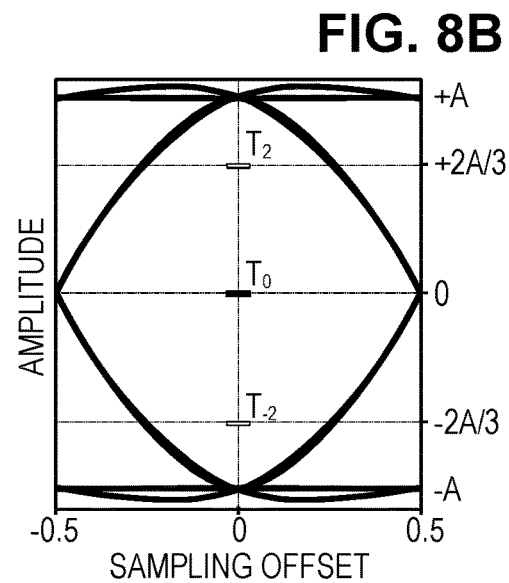
FIG. 8B is an illustrative NRZ (aka PAM2) eye diagram.

For comparison, FIG. 8B is an illustrative NRZ eye diagram showing the (active) $T_0$ decision threshold along with the (inactive) $T_{-2}$, $T_2$ decision thresholds. If a conventional tuning algorithm is applied to the inactive thresholds during NRZ signaling, the thresholds will be badly tuned if and when PAM4 signaling returns. To address this issue, tuning of the inactive thresholds during NRZ signaling may be limited to adapting the equalizers with the desired $\pm A$ minimum and maximum sampling instant signal values and tuning the inactive thresholds to their nominal settings. If typical signaling nonlinearities are known, the nominal settings can be adjusted to account for those nonlinearities.

Figure 9:
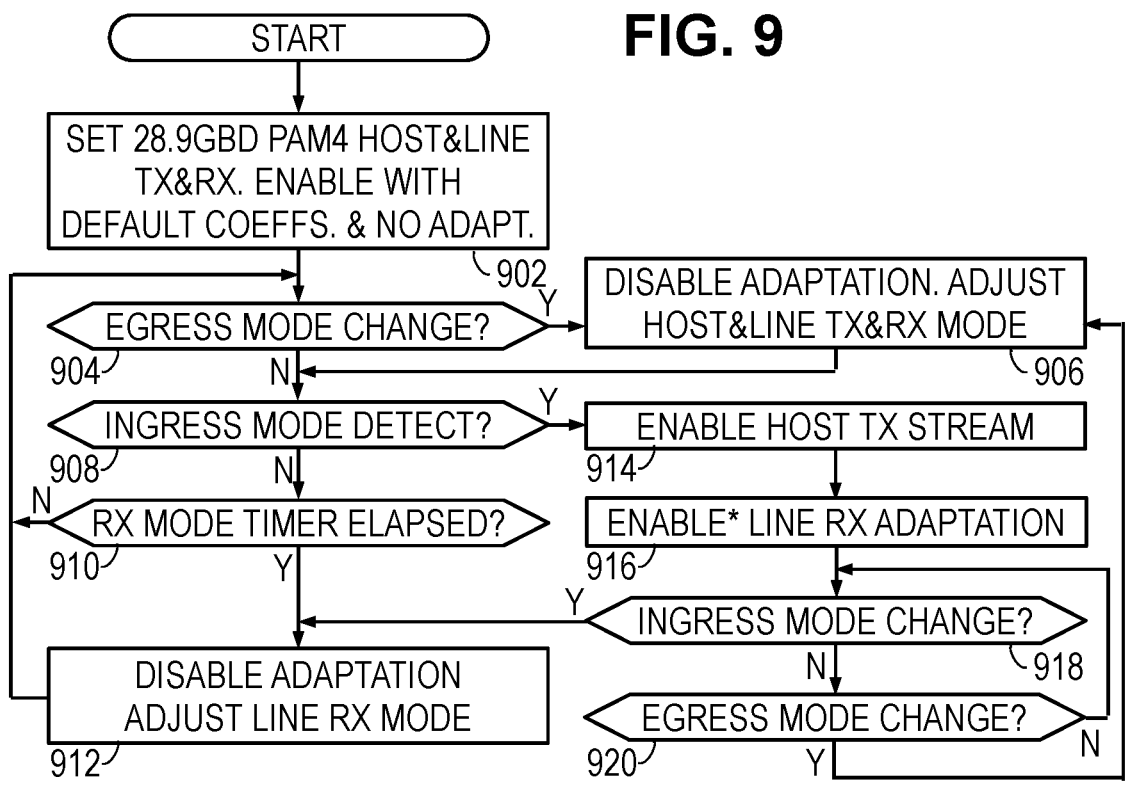
FIG. 9 is a flow diagram of an illustrative training method.

One potential approach to these various issues is now discussed with reference to FIG. 9. In block 902, the optical module's line-side transmitter (and thus its host-side receiver) is set to operate at its highest supported speed, which in this example is 64GFC, using a fixed symbol rate of 28.9 Gbaud. The line-side receiver (and thus its host-side transmitter) is also initially set to operate at the highest supported speed. The pre-equalizer and equalizer filters are configured with default coefficient values suitable for use with most standard-compliant channels. Adaptation of the coefficient values and tuning of the decision thresholds is initially disabled.

The Fibre Channel standard specifies that the transmit (egress) mode is maintained for a predetermined interval 604, unless the link speed negotiation is completed earlier by agreement with the remote node. The attempted reception at each supported speed may be a predetermined fraction of the interval 604, unless the host asks for shorter attempts in an effort to reduce negotiation time. In block 904, the module checks whether the predetermined interval 604 has elapsed (or whether there exists another reason to change egress mode, such as a command from the host device). If so, the module in block 906 ensures that coefficient adaptation and threshold tuning is disabled, and sets the egress mode for the next supported speed. The supported speeds are attempted in order from highest to lowest, and the cycle is repeated as needed.

In block 908 the optical module determines whether the line-side receiver has successfully detected the receive data stream with the currently selected ingress speed settings. If not, the optical module determines in block 910 whether the timer has elapsed for the current ingress speed settings. If not, control returns to block 904. If so, the optical module ensures in block 912 that coefficient adaptation and threshold tuning are disabled, configures the ingress mode for the next supported speed, before returning to block 904.

Successful detection of the ingress mode is achieved when the receiver achieves and maintains transmission word synchronization for a predetermined number of transmission words (e.g., 1000 words). During the link speed negotiation and training phases, this task may be aided by the frame markers that delineate the training frames. When successful detection is achieved in block 908, the optical module in block 914 signals the host device or otherwise enables the host-side transmit data stream, passing along the successfully detected receive symbol stream.

In block 916 the optical module further enables the adaptation of pre-equalizer and equalizer coefficients, tuning of the decision thresholds, and optimization of the sampling clock. The adaptation, tuning, and optimization may be enabled subject to certain conditions, and in the absence of these conditions, may be kept disabled. For example, the sampling clock optimization may be enabled if the ingress mode is 64GFC (28.9 Gbaud) or 32GFC (28.05 Gbaud), and disabled for lower speeds. At such lower speeds, the receive signal then becomes oversampled. The decision threshold tuning may be enabled for the 64GFC (PAM4) ingress mode after the link speed negotiation phase. For all other ingress modes the decision thresholds may be set to default values.

Finally, the coefficient adaptation may be enabled if the ingress mode is 64GFC, 32GFC, or other speeds as long as the receive signal is expected to be stable. The lower speeds are expected to lack sufficient energy in the high frequency portion of the spectrum, such that adaptation is preferably disabled or modified to account for the lack of high frequency signal energy. Even after allowing for time to acquire transmission word synchronization, the expected stability period for the receive signal is at least 35 ms, corresponding to well over a million training frames. The training coefficient values may be periodically saved for possible restoration in the event of an unexpected ingress speed transition, which may be detected by monitoring the receive signal spectrum and/or the equalization error energy. A single-point FFT could be performed periodically (e.g., every 10 ms) to determine whether signal energy at 14 GHz falls below a predetermined threshold.

In block 918, the optical module checks for an ingress mode change. The optical module can detect unexpected ingress mode changes as described above, by using a timer to predict the ingress mode change, by a command from the host device, or via side channel status information from the remote node. If an ingress mode change is detected, the optical module may ensure adaptation, tuning, and optimization are disabled in block 912, and prepare for the next supported ingress speed. Otherwise, in block 920, the optical module checks for an egress mode change. The timing of egress mode changes is determined pursuant to the standard or by command from the host device. If the egress mode changes, control passes to block 906. Otherwise the module loops through blocks 918, 902 monitoring for further speed changes.

The foregoing approach may offer certain advantages as follows. By providing a fixed sampling clock rate from the PLL, we can avoid the lengthy settling times associated with sudden transitions in the frequency of the sampling clock. By disabling tuning of the $T_{-2}, T_2$ decision thresholds during NRZ signaling, their values can be preserved for improved performance when PAM4 signaling occurs. Alternatively, the inactive PAM4 thresholds can be set by assuming signal is linear. For example, PAM4 top and bottom thresholds are set to default $\pm 2A/3$ values during NRZ signaling if equalizer has only FFE.

By disabling equalizer training near speed transitions, we can ensure training is only performed on stable receive signals. By disabling or modifying equalizer training while oversampling lower baud rates, equalizer performance is improved at the higher sampling rates. If the link speed negotiation indicates a lower baud rate should be used, the higher speeds can be dropped from the negotiation process and the negotiation repeated with the PLL set to a lower sampling clock to enable proper training of the coefficients.

Numerous alternative forms, equivalents, and modifications will become apparent to those skilled in the art once the above disclosure is fully appreciated. For example, the above-described disabling of adaptation, tuning, or optimizing can be variously achieved by setting the error scaling factor to zero, by zeroing the update step size, by "freezing" the relevant integrator(s), or by storing and reverting to accumulated error values. It is intended that the claims be interpreted to embrace all such alternative forms, equivalents, and modifications that are encompassed in the scope of the appended claims.

What is claimed is:

1. A retimer module comprising:
   an analog to digital converter that uses a sampling clock to digitize a receive signal;
   an equalizer that converts the digitized receive signal into an equalized signal;
   a decision element that derives a receive symbol stream from the equalized signal;
   a clock recovery module that derives the sampling clock based at least in part on an equalization error of the equalized signal, the sampling clock having a frequency with a range including a baud rate of the receive signal at a first supported speed and including a frequency not less than twice the baud rate of the receive signal at a second supported speed; and
   an adaptation module that disables updating of equalizer coefficients when the baud rate of the receive signal is not within said range.

2. The retimer module of claim 1, wherein during a link speed negotiation phase, the adaptation module enables updating of the equalizer coefficients only within a predetermined window after transmission word synchronization is achieved.

3. The retimer module of claim 2, wherein the adaptation module at least temporarily disables updating of the equalizer coefficients when detecting or initiating an ingress speed change.

4. A retimer module comprising:
an analog to digital converter that uses a sampling clock to digitize a receive signal;
an equalizer that converts the digitized receive signal into an equalized signal;
a decision element that derives a receive symbol stream from the equalized signal; and
a clock recovery module that derives the sampling clock based at least in part on an equalization error of the equalized signal, the sampling clock having a frequency with a range including a baud rate of the receive signal at a first supported speed and including a frequency not less than twice the baud rate of the receive signal at a second supported speed, wherein the clock recovery module includes:
a timing error unit that determines a timing error signal based at least in part on the equalization error;
a phase interpolator that obtains the sampling clock from a clock signal and a control signal derived from the timing error signal;
a phase lock loop that generates the clock signal; and
a feedback path that controls a frequency of the clock signal based at least in part on the timing error signal when the baud rate of the receive signal is within said range, wherein the feedback path includes an error accumulator that is frozen when the baud rate of the receive signal is not within said range.

5. A retimer module comprising:
an analog to digital converter that uses a sampling clock to digitize a receive signal;
an equalizer that converts the digitized receive signal into an equalized signal;
a decision element that derives a receive symbol stream from the equalized signal, wherein the decision element employs multiple decision thresholds;
a clock recovery module that derives the sampling clock based at least in part on an equalization error of the equalized signal, the sampling clock having a frequency with a range including a baud rate of the receive signal at a first supported speed and including a frequency not less than twice the baud rate of the receive signal at a second supported speed; and
an adaptation module that tunes the decision thresholds during four-level pulse amplitude modulation (PAM4) signaling and disables tuning during non-return to zero (NRZ) signaling.

6. The retimer module of claim 5, wherein the adaptation module preserves the tuned decision thresholds during the NRZ signaling.

7. The retimer module of claim 5, wherein the sets inactive decision thresholds to default values during the NRZ signaling.

8. The retimer module of claim 5, wherein the adaptation module disables updating of equalizer coefficients when the baud rate of the receive signal is not within said range.

9. The retimer module of claim 8, wherein during a link speed negotiation phase, the adaptation module enables updating of the equalizer coefficients only within a predetermined window after transmission word synchronization is achieved.

10. The retimer module of claim 9, wherein the adaptation module at least temporarily disables updating of the equalizer coefficients when detecting or initiating an ingress speed change.

11. A retiming method comprising:
digitizing a receive signal in accordance with a sampling clock;
converting the digitized receive signal into an equalized signal;
obtaining a receive symbol stream from the equalized signal;
deriving the sampling clock based at least in part on an equalization error of the equalized signal, the sampling clock having a frequency with a range including a baud rate of the receive signal at a first supported speed and including a frequency not less than twice the baud rate of the receive signal at a second supported speed; and
disabling updates of equalizer coefficients when the baud rate of the receive signal is not within said range.

12. The retiming method of claim 11, wherein during a link speed negotiation phase, updates of the equalizer coefficients are enabled only within a predetermined window after transmission word synchronization is achieved.

13. The retiming method of claim 12, further comprising at least temporarily disabling updates of the equalizer coefficients when detecting or initiating an ingress speed change.

14. A retiming method comprising:
digitizing a receive signal in accordance with a sampling clock;
converting the digitized receive signal into an equalized signal;
obtaining a receive symbol stream from the equalized signal; and
deriving the sampling clock based at least in part on an equalization error of the equalized signal, the sampling clock having a frequency with a range including a baud rate of the receive signal at a first supported speed and including a frequency not less than twice the baud rate of the receive signal at a second supported speed, wherein said deriving the sampling clock includes:
determining a timing error signal based at least in part on the equalization error;
obtaining the sampling clock from a clock signal and a control signal derived from the timing error signal;
generating the clock signal with a phase lock loop; and
controlling a frequency of the clock signal via a feedback path based at least in part on the timing error signal when the baud rate of the receive signal is within said range,
wherein the feedback path includes an error accumulator that is frozen when the baud rate of the receive signal is not within said range.

15. A retiming method comprising:
digitizing a receive signal in accordance with a sampling clock;
converting the digitized receive signal into an equalized signal;
obtaining a receive symbol stream from the equalized signal using a decision element with multiple decision thresholds; and
deriving the sampling clock based at least in part on an equalization error of the equalized signal, the sampling clock having a frequency with a range including a baud rate of the receive signal at a first supported speed and including a frequency not less than twice the baud rate of the receive signal at a second supported speed, wherein the decision thresholds are tuned only during four-level pulse amplitude modulation (PAM4) signaling.

16. The retiming method of claim 15, wherein the tuned decision thresholds are preserved during non-return to zero (NRZ) signaling.

17. The retiming method of claim 15, wherein inactive ones of the multiple decision thresholds are set to default values during non-return to zero (NRZ) signaling.

18. The retiming method of claim 15, further comprising: disabling updates of equalizer coefficients when the baud rate of the receive signal is not within said range.

19. The retiming method of claim 18, wherein during a link speed negotiation phase, updates of the equalizer coefficients are enabled only within a predetermined window after transmission word synchronization is achieved.

20. The retiming method of claim 19, further comprising: at least temporarily disabling updates of the equalizer coefficients when detecting or initiating an ingress speed change.

* * * * *